(12) United States Patent
Singh et al.

(10) Patent No.: US 8,219,261 B2
(45) Date of Patent: Jul. 10, 2012

(54) FAN SPEED CONTROL FROM THERMAL DIODE MEASUREMENT

(75) Inventors: Deepak K. Singh, Apex, NC (US); Francois Ibrahim Atallah, Raleigh, NC (US); David Howard Allen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/880,466

(22) Filed: Sep. 13, 2010

(65) Prior Publication Data
US 2010/0332875 A1 Dec. 30, 2010

Related U.S. Application Data

(62) Division of application No. 11/671,555, filed on Feb. 6, 2007, now Pat. No. 7,865,750.

(51) Int. Cl.
*G05D 23/00* (2006.01)

(52) U.S. Cl. ........................................ 700/299

(58) Field of Classification Search .................. 700/299, 700/300, 304; 713/300, 310, 320, 322, 600; 399/92
See application file for complete search history.

(56) References Cited

U.S. PATENT DOCUMENTS

| | | | |
|---|---|---|---|
| 4,417,470 A | 11/1983 | McCracken et al. |
| 4,712,087 A | 12/1987 | Traa |
| 5,029,305 A | 7/1991 | Richardson |
| 5,375,146 A | 12/1994 | Chalmers |
| 5,451,894 A | 9/1995 | Guo |
| 5,457,719 A | 10/1995 | Guo et al. |
| 5,737,342 A | 4/1998 | Ziperovich |
| 5,818,380 A | 10/1998 | Ito |
| 5,844,826 A | 12/1998 | Nguyen |
| 5,852,616 A | 12/1998 | Kubinec |
| 5,959,564 A | 9/1999 | Gross, Jr. |
| 5,990,725 A | 11/1999 | LoCascio |
| 6,034,631 A | 3/2000 | Gross, Jr. |
| 6,037,732 A | 3/2000 | Alfano et al. |
| 6,047,248 A | 4/2000 | Georgiou et al. |

(Continued)

FOREIGN PATENT DOCUMENTS

CN    1716161    1/2006

(Continued)

OTHER PUBLICATIONS

Sasaki et al.; "−1/+0.8 C Error, Accurate Tempearature Sensor using 90nm IV CMOS for On-line Termal Monitoring of VLSI circuits"; 2006; IEEE; pp. 9-12.*

(Continued)

*Primary Examiner* — Albert DeCady
*Assistant Examiner* — Chad Rapp
(74) *Attorney, Agent, or Firm* — Ian D. MacKinnon; Thomas D. Tyson

(57) ABSTRACT

Measurement circuit components are included in an integrated circuit fabricated on a semiconductor substrate. A method is provided for controlling the speed of a cooling fan provided to cool an integrated circuit in which includes the steps of receiving a voltage from a thermal diode, addressing a table of digital temperatures by incrementing the address of the table entries every clock cycle of a circuit clock, converting the addressed data to a second voltage representing temperature, comparing the first voltage to the second voltage, providing a resulting temperature when both the first and second voltages are equal, and adjusting the fan speed accordingly.

5 Claims, 8 Drawing Sheets

U.S. PATENT DOCUMENTS

| | | |
|---|---|---|
| 6,058,502 A | 5/2000 | Sakaguchi |
| 6,070,074 A | 5/2000 | Perahia et al. |
| 6,076,157 A | 6/2000 | Borkenhagen et al. |
| 6,111,414 A | 8/2000 | Chatterjee et al. |
| 6,125,334 A | 9/2000 | Hurd |
| 6,141,762 A | 10/2000 | Nicol et al. |
| 6,172,611 B1 | 1/2001 | Hussain |
| 6,212,544 B1 | 4/2001 | Borkenhagen et al. |
| 6,218,977 B1 | 4/2001 | Friend |
| 6,351,601 B1 | 2/2002 | Judkins |
| 6,429,796 B1 | 8/2002 | Buckley |
| 6,481,974 B2 | 11/2002 | Horng et al. |
| 6,591,210 B1 | 7/2003 | Lorenz |
| 6,625,635 B1 | 9/2003 | Elnozahy |
| 6,713,996 B2 | 3/2004 | Iorio |
| 6,721,581 B1 | 4/2004 | Subramanian |
| 6,721,892 B1 | 4/2004 | Osborn |
| 6,724,214 B2 | 4/2004 | Manna et al. |
| 6,838,917 B2 | 1/2005 | Brass et al. |
| 6,859,113 B2 | 2/2005 | Giousouf et al. |
| 6,897,673 B2 | 5/2005 | Savage et al. |
| 7,086,058 B2 | 8/2006 | Luick |
| 7,093,109 B1 | 8/2006 | Davis et al. |
| 7,096,140 B2 | 8/2006 | Nozuyama et al. |
| 7,100,061 B2 | 8/2006 | Halepete et al. |
| 7,174,194 B2 | 2/2007 | Chauvel et al. |
| 7,184,936 B1 | 2/2007 | Bhandari |
| 7,205,854 B2 | 4/2007 | Liu |
| 7,211,977 B2 | 5/2007 | Squibb |
| 7,228,446 B2 | 6/2007 | Jorgenson et al. |
| 7,256,622 B2 | 8/2007 | Dronavalli |
| 7,282,966 B2 | 10/2007 | Narendra et al. |
| 7,307,439 B2 | 12/2007 | Takamiya et al. |
| 7,321,254 B2 | 1/2008 | Li |
| 7,330,081 B1 | 2/2008 | Asa et al. |
| 7,330,983 B2 | 2/2008 | Chaparro et al. |
| 7,429,129 B2 | 9/2008 | St. Pierre |
| 7,437,581 B2 | 10/2008 | Grochowski et al. |
| 7,696,917 B2 | 4/2010 | Matsuura |
| 7,734,939 B2 | 6/2010 | Kolinummi et al. |
| 7,991,514 B2 * | 8/2011 | Berenbaum et al. .......... 700/300 |
| 2002/0046399 A1 | 4/2002 | Debling |
| 2002/0065049 A1 | 5/2002 | Chauvel et al. |
| 2003/0030483 A1 | 2/2003 | Seki et al. |
| 2003/0057986 A1 | 3/2003 | Amick |
| 2003/0067334 A1 | 4/2003 | Brass et al. |
| 2003/0079150 A1 | 4/2003 | Smith et al. |
| 2003/0126476 A1 | 7/2003 | Greene |
| 2003/0184399 A1 | 10/2003 | Lanoue et al. |
| 2004/0023688 A1 | 2/2004 | Bazarjani et al. |
| 2004/0025061 A1 | 2/2004 | Lawrence |
| 2004/0090216 A1 | 5/2004 | Carballo et al. |
| 2004/0183613 A1 | 9/2004 | Kurd et al. |
| 2004/0268280 A1 | 12/2004 | Eleyan et al. |
| 2005/0114056 A1 | 5/2005 | Patel et al. |
| 2005/0116733 A1 | 6/2005 | Barr et al. |
| 2005/0134394 A1 | 6/2005 | Liu |
| 2005/0174102 A1 | 8/2005 | Saraswat et al. |
| 2005/0178133 A1 * | 8/2005 | Henry et al. .................... 62/186 |
| 2005/0209740 A1 | 9/2005 | Vann |
| 2005/0273290 A1 | 12/2005 | Asano et al. |
| 2005/0278520 A1 | 12/2005 | Hirai et al. |
| 2005/0289367 A1 | 12/2005 | Clark et al. |
| 2006/0066376 A1 | 3/2006 | Narendra |
| 2006/0149974 A1 | 7/2006 | Rotem et al. |
| 2006/0197697 A1 | 9/2006 | Nagata |
| 2006/0237873 A1 | 10/2006 | Reinders |
| 2007/0006007 A1 | 1/2007 | Woodbridge et al. |
| 2007/0074216 A1 | 3/2007 | Adachi et al. |
| 2007/0192650 A1 | 8/2007 | Shiota |
| 2007/0260895 A1 | 11/2007 | Aguilar et al. |
| 2008/0004755 A1 | 1/2008 | Dunstan et al. |
| 2008/0071493 A1 | 3/2008 | Wang |
| 2008/0136400 A1 | 6/2008 | Chi et al. |
| 2008/0170947 A1 * | 7/2008 | Sutardja .......................... 417/32 |

FOREIGN PATENT DOCUMENTS

| | | |
|---|---|---|
| WO | WO2006072106 A2 | 7/2006 |

OTHER PUBLICATIONS

McGowen, "Adaptive Designs for Power and Thermal Optimization," Nov. 2005, pp. 118-121.

Gupta and Rincon-Mora, "Predicting the Effects of Error Sources in Bandgap Reference Circuits and evaluating their Design Implications", IEEE's Midwest Symposium on Circuits and Systems (MWSCAS), vol. 3, pp. 575-578, Tulsa, Oklahoma, 2002.

http://en.wikipedia.org/wiki/Bandgap_voltage_reference.

PCT International Search Report, mailed 0210512008, for PCT application EP2008/050919. 3 pages.

Schweber, A/D and D/A Converters: Critical links that just keep getting better, Apr. 1989, 4 pages.

PCT International Search Report, mailed Jun. 16, 2008, for PCT application EP2008/050922, 4 pages.

Moore, B.D.: "Tradeoffs in Selecting IC Temperature Sensors"; 1999; Elsevier Science; pp. 181-184.

* cited by examiner

FAN SPEED CONTROL FROM THERMAL DIODE MEASUREMENT

CROSS-REFERENCE TO RELATED APPLICATIONS

This application is a divisional of, and claims benefit of the filing date of, U.S. patent application Ser. No. 11/671,555 entitled "FAN SPEED CONTROL FROM ADAPTIVE VOLTAGE SUPPLY," filed Feb. 6, 2007 and now U.S. Pat. No. 7,865,750.

RELATED APPLICATIONS

This application is related to the following U.S. patent applications filed on the same day as the present application and having the same assignee: "On-Chip Adaptive Voltage Compensation," Ser. No. 11/671,485; "Using Temperature Data for Instruction Thread Direction," Ser. No. 11/671,640; "Using Performance Data for Instruction Thread Direction," Ser. No. 11/671,627; "Using IR Drop Data for Instruction Thread Direction," Ser. No. 11/671,613; "Integrated Circuit Failure Prediction," Ser. No. 11/671,599; "Instruction Dependent Dynamic Voltage Compensation," Ser. No. 11/671,579; "Temperature Dependent Voltage Source Compensation," Ser. No. 11/671,568; and "Digital Adaptive Voltage Supply," Ser. No. 11/671,531; each assigned to the IBM Corporation and herein incorporated by reference.

BACKGROUND OF THE INVENTION

1. Technical Field

The present invention relates in general to a system and method for regulating cooling of integrated circuits. In particular, the present invention relates to a system and method for regulating fan speed based on measured temperatures of integrated circuit.

2. Description of the Related Art

Integrated circuits require heat dissipation or cooling. Some integrated systems provide cooling by merely allowing the integrated circuit generated heat to dissipate in the surrounding atmosphere or by aid of heat sinks. Other cases require external devices to provide cooling assistance. Commonly, integrated circuits are mounted on printed circuit boards that are contained within a chassis having a fan mounted to providing airflow through the chassis, in order to cool the integrated circuits.

Present practice is to provide a single speed fan in a chassis. However, as integrated circuits advance in technology and clock frequency increases, cooling becomes more of a concern. Therefore, in some systems, variable speed fans have been provided. A typical way to implement the cooling with a variable speed fan is to connect a veritable speed fan to a thermostat, which measures the air temperature inside of a chassis. Based on the ambient air temperature, the fan speed can be adjusted to provide cooling.

However, the ambient air temperature is not the best measure of the heat of a specific integrated circuit sense. A computer system contains several integrated circuits. Each integrated circuit has its own heat that needs to be dissipated. Certain integrated circuits, such as central processing units or CPUs, require a greater amount of cooling than other integrated circuits in the system. Again, it is not uncommon to provide these CPU integrated circuits with heat sinks or even a fan mounted on the integrated circuit. Thermal diodes have been used in chips to measure junction temperature of provide signals for fan speed control. Some integrated circuits provide a digital output of the temperature signal for controlling fans. However, a need exists to provide a more flexible control of cooling based upon temperature data obtained on the integrated circuit devices.

SUMMARY

In accordance with the present invention, a method for controlling the speed of a cooling fan provided to cool an integrated circuit in which includes the steps of receiving a voltage from a thermal diode, addressing a table of digital temperatures by incrementing the address of the table entries every clock cycle of a circuit clock, converting the addressed data to a second voltage representing temperature, comparing the first voltage, but the second voltage, providing a resulting temperature when both the first and second voltages are equal, and adjusting the fan speed accordingly.

In one embodiment of the present invention, a method for controlling fan speed, including the steps of measuring temperature using several thermal diodes located upon the surface of a single integrated circuit, and determining if the measured temperatures are with and a predetermined temperature range, where the average of the temperatures is used to control the fan speed.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

Figure 1:
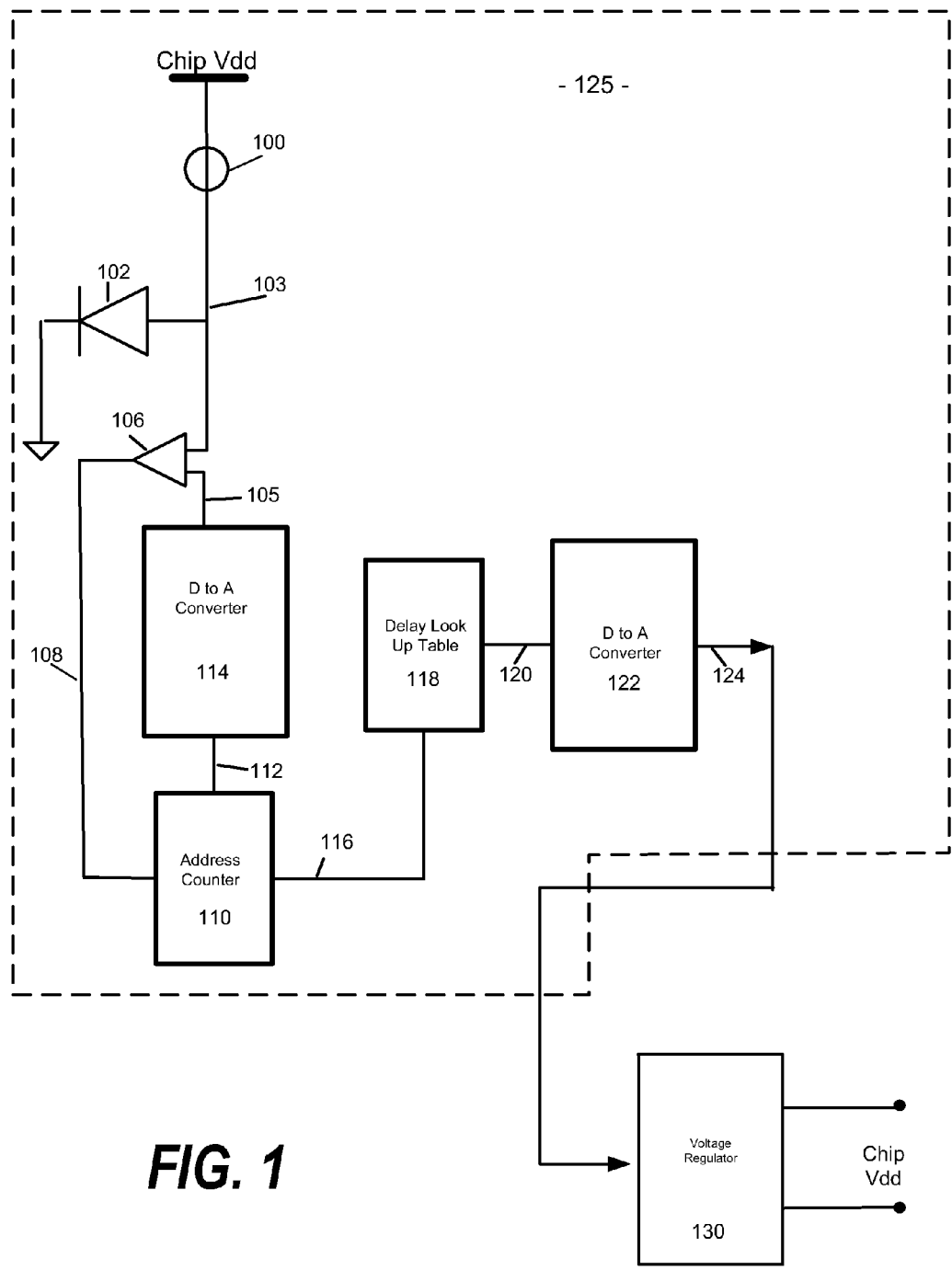
FIG. 1 is a schematic diagram of a simple embodiment of the temperature measurement circuit.

The following is intended to provide a detailed description of an example of the invention and should not be taken to be limiting of the invention itself. Rather, any number of variations may fall within the scope of the invention, which is defined in the claims following the description.

The present invention provides a cooling mechanism including a fan speed controller that operates off of data obtained from an adaptive voltage system. The adaptive voltage system is contained upon the integrated circuit surface itself. In one embodiment of the invention, individual and adaptive voltage systems are contained within each core of a Baltic or integrated circuit. A common application would provide an integrated circuit having multiple CPUs, where each CPU is a core. Each of the adaptive voltage systems contained within each core would provide an input to a fan speed controller that would be connected to a fan to provide cooling for the computer system or for the individual integrated circuit itself.

What follows is a discussion of the adaptive voltage supply, followed by an explanation of how data obtained from the adaptive voltage supply is used to regulate cooling. In the preferred embodiment of the adaptive voltage supply, three physical condition measurements are made. The first is temperature, which is measured by a thermal diode on the surface of the integrated circuit. The second is the IR (voltage) drop measured by two ring oscillator circuits and the third is the frequency performance of the integrated circuit measured by a single loop oscillator compared to stored predetermined performance values.

The complete control signal provided to the voltage regulation circuit is:

Total Vdd scaling=Frequency response scaling+Temperature related Vdd scaling+IR drop related scaling All of the measurement circuits are contained on the surface of this integrated circuit device in the preferred embodiment. These measurements are then used to scale an input control signal to a voltage regulation circuit also contained on the surface of the integrated circuit device or alternatively on another integrated circuit. The output of this voltage regulation device provides the integrated circuit operating voltage (chip Vdd). Thus the voltage supplied to the integrated circuit can be adjusted to either save power or increase performance dynamically during the operation of the chip by under program control. Further the integrated circuit voltage and, therefore, performance can be changed in anticipation of operating environment changes such as a sleep state or the execution of instructions requiring higher circuit performance.

This is a dynamic method of varying voltage that takes into account the specifics of the semiconductor manufacturing process, temperature and IR drop effects simultaneously. This method uses available on-chip data to compute adjustment in voltage necessary to either meet target performance or decrease power consumption. The two goals are met using the same circuit. Another advantage of using this method is the flexibility it offers to the users in terms of programmability. On chip voltage can be artificially varied by writing into special registers which provide values used by the power management circuitry to provide the supply voltage Vdd. This feature can be helpful when expecting instructions that require high circuit performance, essentially providing an "on-Demand" performance capability. In other words, to provide on request, additional circuit supply voltage to increase circuit performance.

This method is not limited to a specific technology or type of circuit. It can be applied to a broad type of integrated circuits, especially those that need to deliver higher performance at lower power consumption.

This method also offers reduction in test time for identifying yield and voltage per module. It is a dynamic solution unlike previous static solutions (fuses, etc) that takes into account effects of IR drop.

FIG. 1 is a schematic diagram of one embodiment of the thermal measurement circuit 125 shown connected to the voltage regulation circuit which provides the integrated circuit voltage source (Chip Vdd). This measurement circuit includes a current source 100 connected to the voltage source. This current source 100 is also connected by a line 103 to a thermal diode 102 also connected to ground. The voltage across the thermal diode 102 indicates the measured temperature of this integrated circuit. This thermal voltage signal is provided over line 103 to an analog comparator 106. The output of the comparator 106 is connected to an address counter 110 providing an address to a digital to analog (D to A) converter 114. The operating range for a thermal diode is commonly zero to 125° C. The address counter 110 includes a look up table with 128 entries. These entries correspond to 0 to 127 degrees C. Initially, the address counter 110 starts at zero degrees and increments upward each clock cycle. Each address is provided to the D to A converter 114 over line 112. In operation, the analog comparator 106 compares the output of the D to A converter 114 with the measured thermal voltage provided by the thermal diode 102. When the address counter 110 provides an output representing the same temperature as the thermal diode 102, the output voltage from the D to A converter 110 will be the same voltage as that provided by the thermal diode 102. The output of the analog comparator 106 will then be zero. The address counter 110 will then stop incrementing and provide a signal over line 116 to a delay lookup table (LUT) circuit 118. This value on line 116 is a digital signal representing the temperature measured by the thermal diode 102. This thermal voltage value is used to address a corresponding delay value in the delay lookup table circuit 118. The delay lookup table in circuit 118 is a table of delay pulse width values computed by a simulation of the performance of the integrated circuit. Each value represents the expected delay value computed for the temperature range of 0 to 127 degrees C. for expected integrated circuit performance.

To measure the process on the substrate, a ring oscillator connected to a temperature compensated voltage source (ex: a bandgap reference) is used. In this case, for a given temperature, the pulse width produced by the ring oscillator is a function of the process on the substrate since temperature and voltage are constant. By using a bandgap reference, the voltage applied to a ring oscillator can be kept constant. But the temperature of the substrate depends upon internal and external operating conditions and it cannot be held constant. To eliminate the effects of varying temperature, another scheme is used in this invention.

First, a target predicted circuit performance number (pcpn) is chosen. This number represents the expected circuit performance based on expected semiconductor manufacturing process. This number represents circuit performances expected under nominal applied voltage across the entire operating temperature range. For this pcpn, a simulation of the ring oscillator supplied by a constant voltage from a bandgap reference is carried out for the entire operating temperature range. This simulation yields pulse widths that are generated at a fixed voltage and pcpn values where only the temperature is varied across the entire operating temperature range. If the substrate pcpn is identical to the desired target performance, then the substrate would also yield identical pulse widths for each value of the operating temperature range.

If the substrate pcpn is different than the desired target performance, then the pulse widths produced by the substrate will be either shorter or longer than those produced by simulation depending upon whether the substrate pcpn was faster or slower than the desired target performance. So a comparison has to be made between the pulse width generated by the ring oscillator on the substrate with a simulated value of the pulse with at the value of the substrate temperature at a fixed voltage. The expected pulse width values at the desired target process for each temperature value within the desired operating temperature range are stored in a Look Up Table (LUT) (for example, 118 in FIG. 1) that is addressed by the current substrate temperature, i.e. based on the substrate temperature, the address pointer points to an entry in the LUT that contains the expected pulse width from the ring oscillator circuit at the desired process corner at a fixed bandgap voltage. For this invention, the operating temperature range is 0° C. to 127° C. and this range is divided into 128 steps of 1° C. each. This requires 128 entries in the LUT, one entry corresponding to each 1° C. rise in temperature.

This resulting pulse width value from the delay lookup table circuit 118 provides a voltage scaling signal in digital form which is converted to an analog voltage signal by D to A converter 122. This scaling voltage signal is provided to a voltage regulator 130 over line 124. The operation result of the circuit 125 would be to increase or decrease the resulting voltage of regulator circuit 130 (chip Vdd) based upon the measured temperature of the integrated circuit measured by thermal diode 102.

Figure 2:
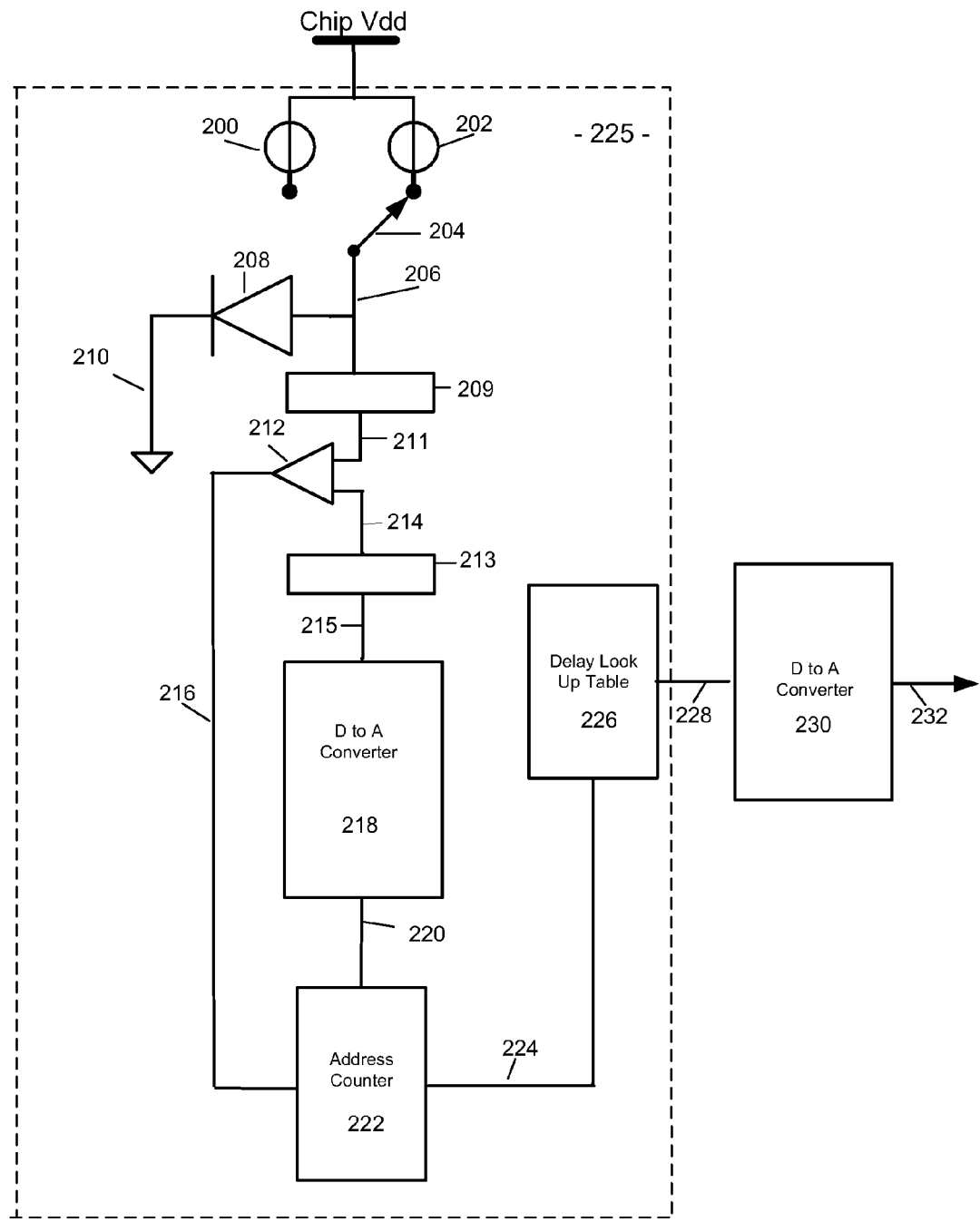
FIG. 2 is a schematic diagram of a second embodiment of the temperature measurement circuit.

FIG. 2 is a second embodiment of the thermal measurement circuit illustrated in FIG. 1. The temperature measurement circuit 225 of FIG. 2 includes two current sources 200 and 202 which are selectively connected to a thermal diode 208 through a switch 204 connected by line 206. The diode is actually made up of a lateral PNP device fabricated in CMOS technology. The collector and base of this device are shorted leaving the diode between base and emitter.

Digital temperature sensors are based on the principle that the base-emitter voltage, $V_{BE}$, of a diode-connected transistor is inversely proportional to its temperature. When operated over temperature, $V_{BE}$ exhibits a negative temperature coefficient of approximately −2 mV/° C. In practice, the absolute value of $V_{BE}$ varies from transistor to transistor. To nullify this variation, the circuit would have to calibrate each individual transistor. A common solution to this problem is to compare the change in $V_{BE}$ of the transistor when two different current values are applied to the emitter of the transistor.

Temperature measurements are made using a diode that is fed by 2 current sources, one at a time. Typically the ratio of these current sources is 10:1. The temperature measurement requires measuring the difference in voltage across the diode produced by applying two current sources.

Line 206 is connected to a "sample and hold" circuit 209 to sample and hold a voltage output of the thermal diode 208. The address counter circuit 222 operates identically to the address counter, circuit 110 of FIG. 1 previously discussed. Address counter circuit 222 increments an address every clock cycle which provides a digital signal representing the temperature range of zero to 127° C. over line 220 to the D to A converter 218 which converts this digital signal representing temperature to a voltage. This voltage signal is provided on line 215 to a second sample and hold circuit 213. Both the sample of the hold circuits 209 and 213 will sample and hold their respective voltages for the comparator 212 so that continuing small variations in temperature from the thermal diode 208 will not adversely affect the operation of this temperature measurement circuit 225. Upon reaching the measured temperature, the comparator 212 will provide a zero output over line 216 to the address counter 222 which provides a digital signal representing the measured temperature on line 224 to the delay lookup table circuit 226. The operation of the delay lookup table circuit 226 providing a digital delay value on line 228 to the D to A converter 230 is the same as previously discussed for the measurement circuitry 125 in FIG. 1.

Figure 3:
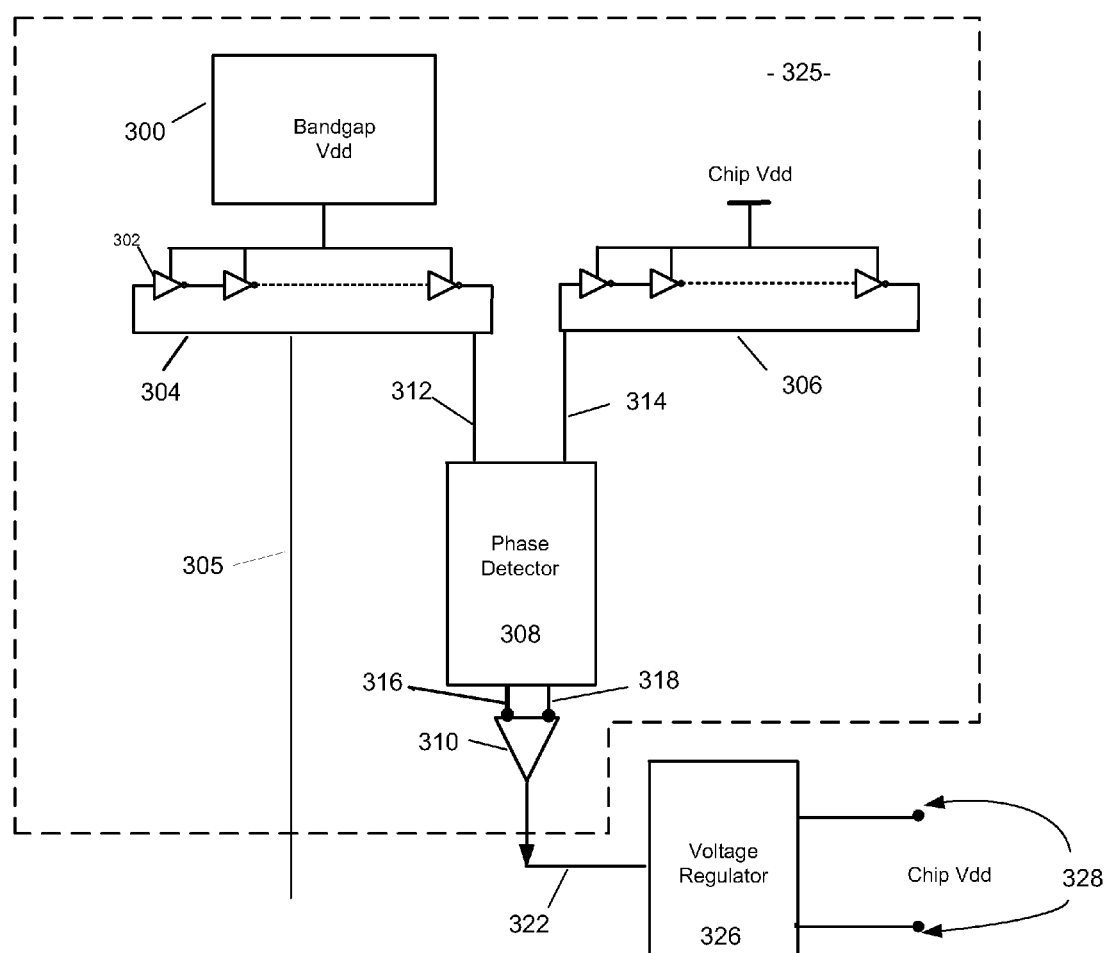
FIG. 3 is a schematic diagram of the two ring oscillator circuit that provides input for the frequency response measurement and provides the IR drop measurement.

FIG. 3 is a schematic diagram of the IR drop measurement circuit 325 which provides voltage scaling signal to a voltage regulator circuit 326. A band gap voltage source 300 is connected to a ring oscillator circuit 304. The ring oscillator circuit 304 consists of an odd number of inverters 302 connected in a loop or ring. The band gap source is obtained from the physical integrated circuit itself and is nominally 1.23 V. A second ring oscillator circuit 306 connected to the chip voltage source provides an output on line 314. The band gap ring oscillator provides an output on line 312. A phase detector 308 is connected to lines 312 and 314 to determine the difference or delay between the pulses provided by the two ring oscillator circuits 304 and 306. The phase detector 308 provides a voltage magnitude output and a voltage polarity output on lines 316 and 318 respectively which in combination represent the delay difference between the ring oscillator circuits 304 and 306. Lines 316 and 318 are input to a comparator 310 which provides a voltage scaling signal on line 322 to the voltage regulator 326. It should be understood that this voltage scaling signal on line 322 is based solely upon the IR drop of the integrated circuit. Based on the voltage scaling signal of line 322, voltage regulator 326 provides the appropriate chip Vdd value. In the preferred embodiment, the two ring oscillator circuits 304 and 306 should be located in close proximity to each other so that the effects of any irregularities across the surface of the integrated circuit will be minimized.

The frequency response of the integrated circuit (or performance of the integrated circuit) can be measured by using the output of a band gap voltage connected ring oscillator 304 on line 305 of FIG. 3 and the lookup table containing known delay values based on chip temperature from circuit 226 or FIG. 2. This is illustrated in combination with the IR drop measurement of circuit 325 and the temperature measurement of circuit 225 in FIG. 4. In the IR drop measurement circuit 325, the band gap connected ring oscillator 304 provides a second signal connected to an integrator circuit 414, which takes the pulse signal from the band gap connected ring oscillator 304 of circuit 325 and converts it into a voltage which is then provided to difference circuit 416. Another input line 415 to the difference circuit 416 is compared to the delay voltage signal output from the D to A converter 230 representing the expected delay based on the measured temperature. The output of this difference circuit 416 represents a voltage indicative of the integrated circuit frequency response or performance of the integrated circuit. More specifically, this signal provided to multiplexer 418 represents the actual integrated circuit performance compared to the expected integrated circuit performance for that temperature. If the expected delay signal on line 415 is less than the delay signal from integrator circuit 414, the chip is performing below expectations and the voltage Vdd should be increased. Conversely, if the expected delay on line 415 is greater than the delay signal from integrator circuit 414, the chip is performing above expectations and the voltage Vdd could be lowered to save power.

Figure 4:
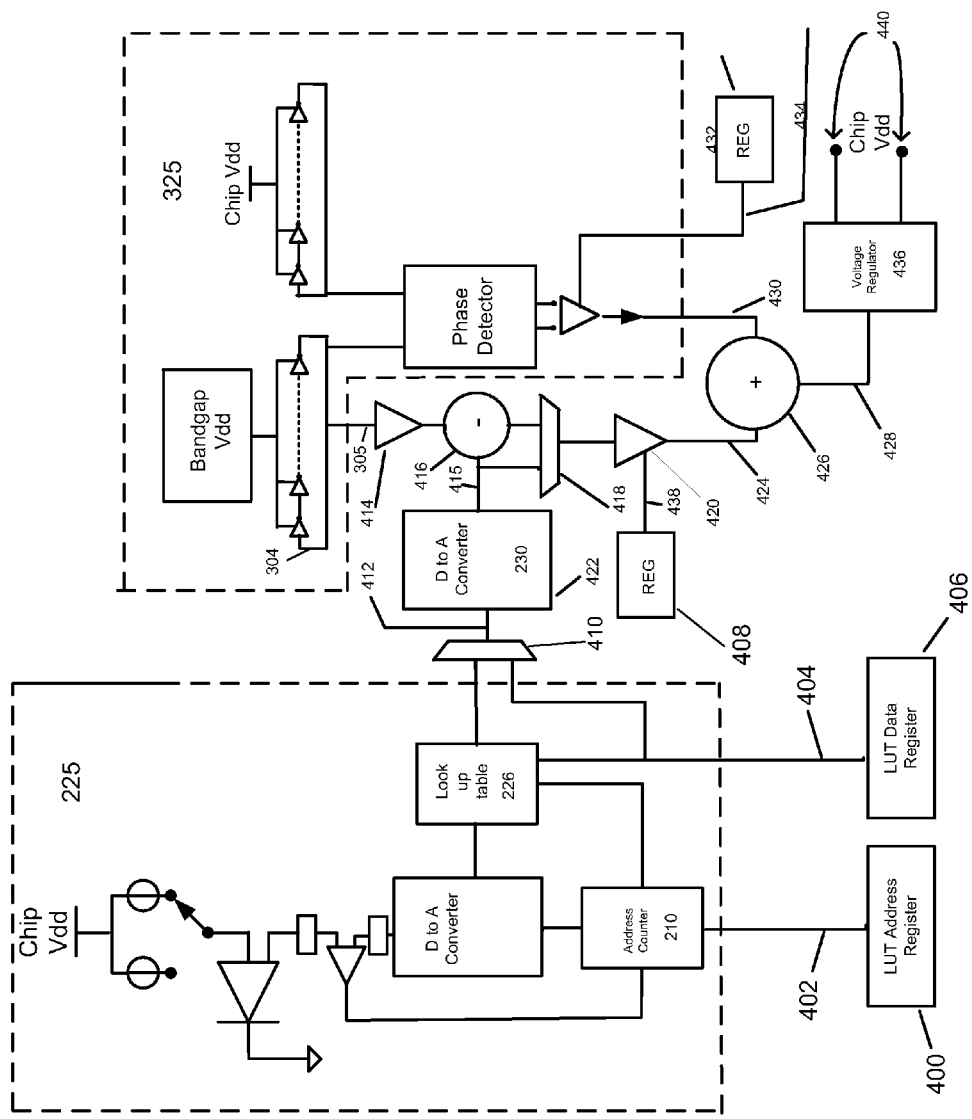
FIG. 4 is a schematic diagram of the preferred embodiment of the adaptive voltage compensation circuit.

FIG. 4 also illustrates the preferred embodiment of the invention combining the temperature measurement circuit 325 output, the IR drop measurement circuit 325 output with the frequency response measurement as discussed above. In this embodiment, the temperature measurement circuit includes a lookup table address register 400 connected to the address counter 210 by line 402 to provide an initial address or to provide an artificially changed temperature that would result in an artificially changed voltage scaling signal. Also, the lookup table data register 406 is provided that may provide a directed input into the delay lookup table 226. This can be used to provide entries into the delay lookup table or provide bypass data output directly to multiplexer 410 which is input to the D to A converter 230. In this manner, a programmer could directly control the delay value, which is used to compute the voltage scaling signal on line 428. The output of the D to A converter 230 is provided on line 415 directly to the difference circuit 416 and to the multiplexer 418. In this manner the multiplexer 418 may bypass the difference circuit 416 and only provide the temperature dependant table delay value to the driver 420. The driver 420 is connected to a register 408 by line 438 which can be used to control the amount of signal output on line 424 to the summing circuit 426. Likewise, in circuit 325, register 432 provides on line 434, a signal that can be used to vary the amount of the scaling signal output from the circuit 325 to the summing circuit 426. The output from summing circuit 426 is the voltage scaling signal on line 428 and is provided to the voltage regulator 436 which in turn provides the integrated circuit voltage (chip Vdd) 440.

Figure 5:
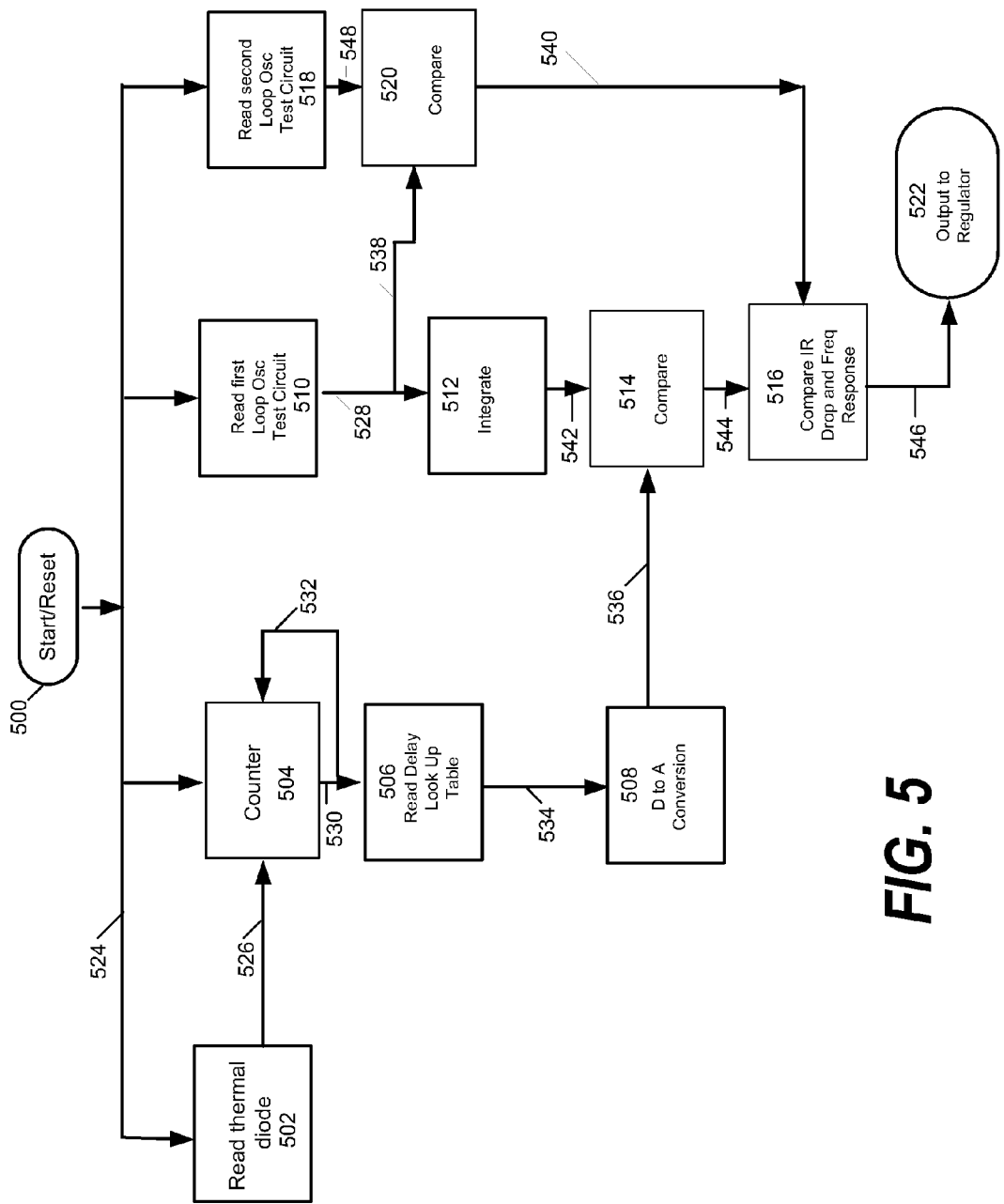
FIG. 5 is a flow chart representing the operation of the adaptive voltage compensation circuit.

FIG. 5 is a process flow chart representing the operation of the invention. It is important understand, that FIG. 5 is not a flow chart representing software execution but of a simultaneous process producing the voltage scaling signal previously discussed in the operation of the different functional units of the present invention. The discussion of this flowchart of FIG. 5 will also reference FIGS. 2, 3 and 4 respectively. In the start phase 500, path 524 illustrates the simultaneous operation of the different aspects of this invention. In step 502, the thermal diode 208 provides an output voltage indicating the measured circuit temperature on line 506 to process block 504. Process block 504 represents the operation of the address counter 222, the D to A converter 218 and the voltage comparator 212 (of FIG. 2) in determining a digital signal representative of the circuit temperature as previously discussed. Referring to FIG. 5, this digital temperature is provided on path 530 to the delay lookup table in step 506 which provides a digital signal representative of the delay on path 534 to the D to A conversion step 508 resulting in the delay signal voltage provided to the comparator 514 over path 536.

Returning to path 524, the frequency response value measured in block 510 is provided in path 528 to both the integration block 512 and to the compare block 520 by line 538 as discussed in FIG. 4. The integration circuit 414 of FIG. 4 provides the frequency response measurement signal to the compare block 514 over path 542 which is then compared to the delay signal on path 536. This result of this comparison is provided on path 544. Returning to path 524, the measurement of the IR drop from the ring oscillator 306 connected to the chip voltage supply is compared with the ring oscillator 304 connected to the bandgap voltage source in step 520. The output on path 540 represents the IR drop portion of the voltage scaling signal and is combined in step 516 to produce the overall voltage scaling signal 546 provided to the regulator 436 in step 522. It is important understand that this voltage scaling signal results from the combination of the measurements for temperature, IR drop and circuit frequency response.

Regulation of Fan Speed by Data from the Adaptive Voltage Supply

Figure 6:
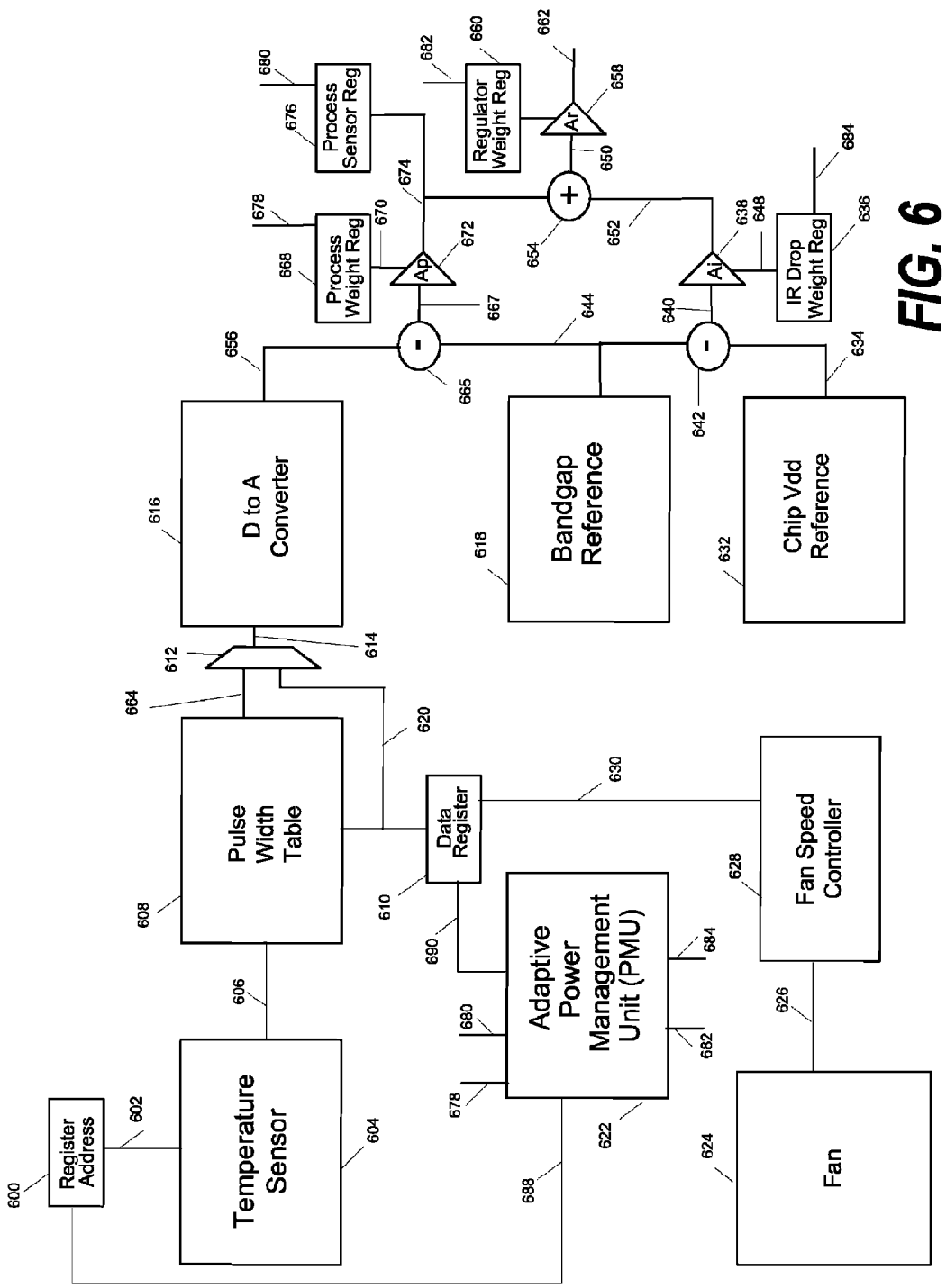
FIG. 6 is a block diagram of an adaptive voltage supply system connected to a fan speed controller and a fan.

FIG. 6 is a block diagram of an adaptive voltage supply. That includes an adaptive power management unit (PMU) 622, a fan speed controller 628 connected by line 626 to a fan 624. In FIG. 6, the temperature sensor, 604 is similar to the temperature sensing circuit of FIG. 2, which includes the data provided to a pulse width table 608 from line 606. The pulse width table 608 is similar to the delay lookup tables 226 of FIG. 2. In the embodiment shown in FIG. 6, the pulse width table is connected by line 620 to a data register 610 which provides data to and from the pulse width table 608, to the PMU 622 by line 690 and to the fan speed controller 628 by line 630. As discussed in FIG. 4, the data register 610 provides data on line 620 to multiplexer 612 as does the pulse width table 608 through line 664. The output of the multiplexer 612 is provided on line 614 to the D to A converter 618 as previously discussed in FIG. 4. As was discussed in FIG. 3, FIG. 6 also includes a bandgap reference circuit 618 and chip Vdd reference circuit 632. The D to A converter 618 provides the expected pulse width data to the difference circuit 665 which also receives the bandgap reference pulse width from the bandgap reference circuitry 618 provided on line 644. This difference signal is provided on line 667 to the driver 672. In the embodiment shown in FIG. 6, a process weight register 668 is included to provide a weight value on line 670 to the driver 672 to either increase or decrease the effect of this measured difference the two pulse widths. Register 668 is also connected to the PMU 622. The bandgap reference circuit 618 is also connected to a difference circuit 642 on line 644 along with the chip Vdd reference signal from circuit 632 connected by line 634. This signal, as previously discussed, is provided on line 642 to driver 638 and represents the IR drop value. Similarly to register 668, a register 636 is provided that contains a weighting efficient to either increase or decrease the effect of the IR drop value in the control of the voltage supply output. This register 636 is connected to the driver 638 by line 648. Additionally, register 636 is connected to the PMU 622 by line 684. Returning to driver 672, the output of this driver 672 on line 674 is provided to a summing circuit 654 and to a process sensor register 676. The process sensor register 676 stores the data representing the process performance data and is provided on line 682 the PMU 622.

The summing circuit, 654 also receives the IR drop data from driver 638 on line 652 and the output of the summing circuit 654 is provided on line 650 to a driver 658 which is also connected by line 661 to a regulator register 660 having a coefficient providing how much influence this circuit will provide to voltage supply output or Vdd provided to the overall integrated circuit or integrated circuit core. This weight register 660 provides a connection on line 682 to the PMU 622.

However for the purposes of fan speed control, only the data that is present in the data register 610 is needed from the adaptive voltage supply circuit of FIG. 6.

Figure 7:
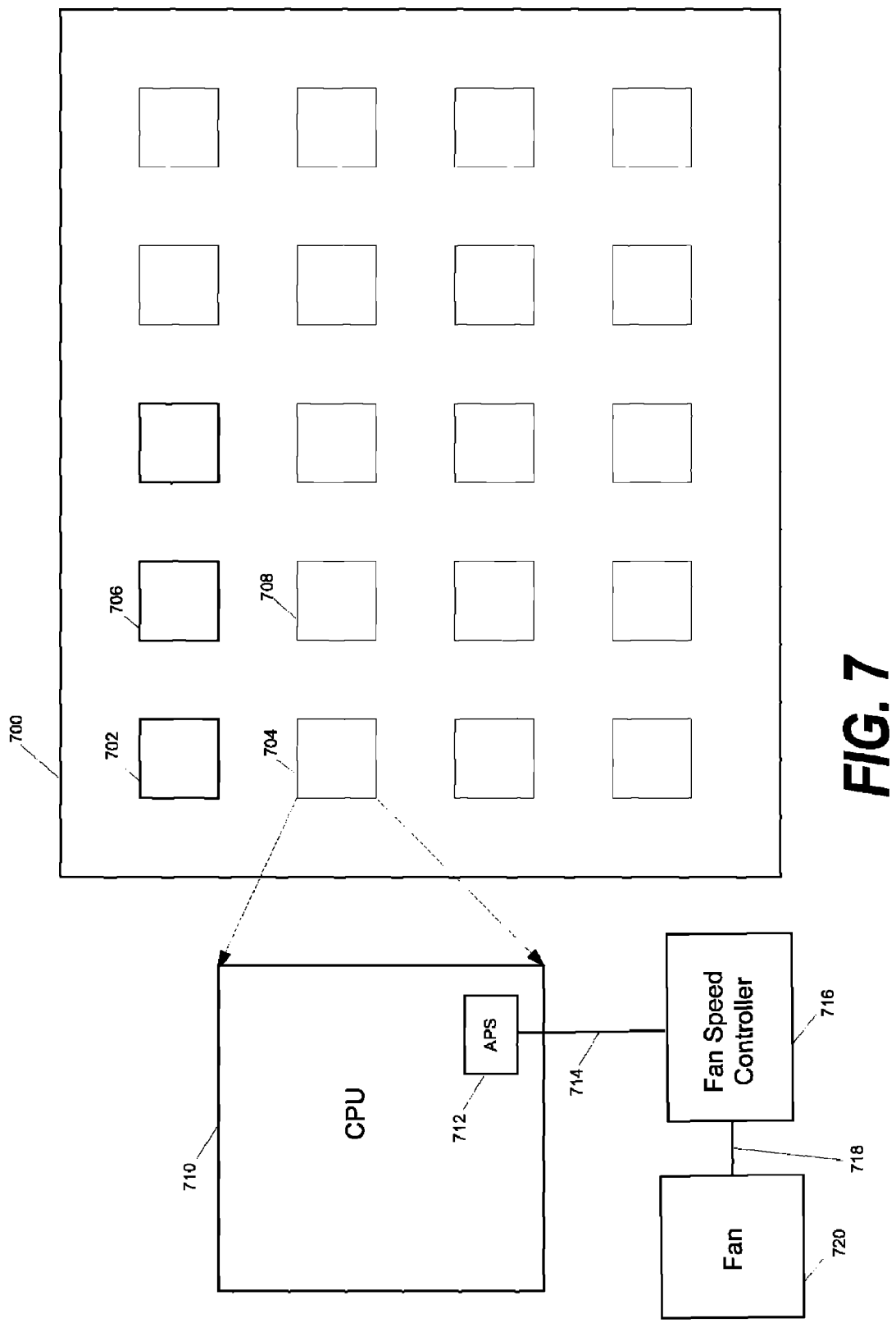
FIG. 7 is a diagram illustrating a single integrated circuit containing several cores that each included adapter power supply.

FIG. 7 illustrates another embodiment of the present invention, where a single integrated circuit device 700 includes several cores such as 702, 704, 706 and 708. Commonly, the cores would be central processing unit CPU cores. In the embodiment shown, core 704 has been exploded in the diagram to core 710 and includes an adaptive power supply circuit 712. In one embodiment, each of the cores of the integrated circuit 700 would also include individual adaptive power supply circuits per core. Therefore, each adaptive power supply for each core would provide temperature values to the fan speed controller 716 even though only a single temperature line from adaptive power supply 712 is shown on line 714. In this manner, the fan speed controller can regulate the fan speed and thus the cooling for the integrated circuit by individual measurements of core temperatures for each core. The fan speed controller then regulates the fan speed based on the collective and/or individual core temperatures.

Figure 8:
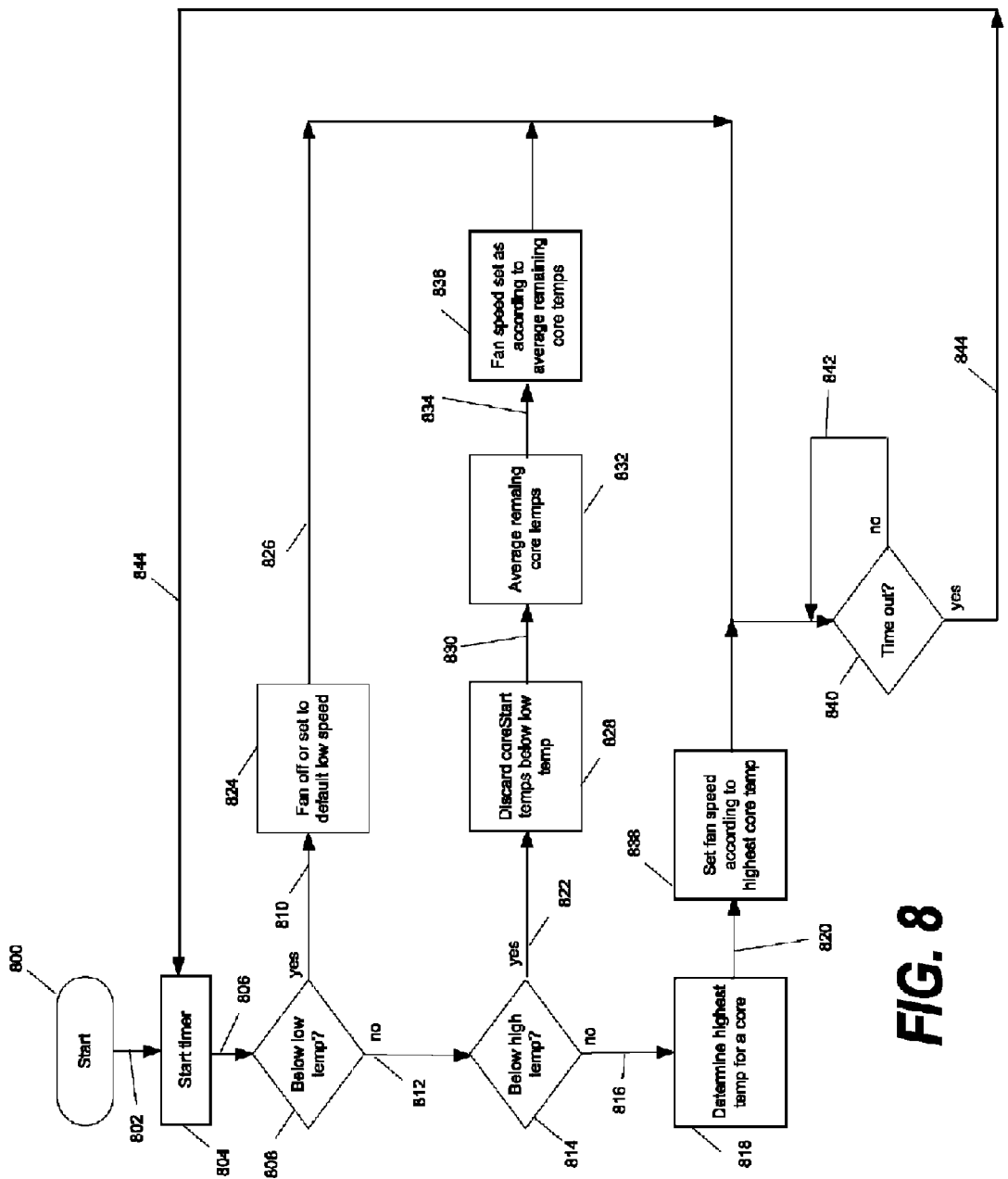
FIG. 8 as a flow chart detailing the procedure executed by the fan speed controller.

FIG. 8 is a flow chart representing the procedure executed with on the fan speed controller previously discussed. The process is started at 800 and progresses through line 802 to start a timer 804. The operation of the timer is to allow periodic adjustments to the fan speed. In one embodiment, the timer resets every 1000 clock cycles of the CPU. Once the timer is started, the process continues on line 806 to a decision 808 to determine if the temperature measured from the adaptive power supply or supplies are below a minimum temperature value. If yes, this procedure continues on line 810 to block 824 where the fan is turned off or alternatively, set to a low fan speed. The procedure continues on line 826.

Returning to decision 808, if the measured temperature is not below a minimum temperature, the process continues on line 812 to decision 814 to determine if the temperature is below a high temperature value. If so, the process continues on line 822 to block 828 where multiple core temperature values are examined and the core temperature values below the minimum temperature of decision 808 are discarded. The procedure continues on line 830 to block 832 where the remaining core temperatures are averaged. The procedure continues on line 834 to block 836 where the fan speed is set according to the average of these remaining core temperatures. It should be understood by those skilled in the art that a simple coefficient could be multiplied by the average of core temperatures to obtain a signal value to be provided to the fan to regulate the fan speed. Upon exiting block 836, the procedure continues on line 826. Returning to decision 814, if the temperature is not below the high of block 818, the highest temperature of a any individual core is determined. The procedure continues on line 820 to block 838 where the fan speed is then set according to this highest core temperature. The procedure exits block 838 on line 826 which is connected to decision 840. In decision 840, it is determined whether the timer has timed out. If not, the procedure just loops back over line 842 until the timer does timeout. In this manner, a small interval of time is provided for a constant fan speed and the effect of cooling to take place. Once the timer has timed out, the process continues on line 844 back to start the timer again in block 804.

While this discussed embodiment shows only a single voltage control circuit on the integrated circuit, it should be apparent that multiple voltage control circuits may be utilized to provide different voltages to different portions of the integrated circuit.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for controlling fan speed, comprising:
   measuring temperature using a plurality of thermal diodes located on a surface of a single integrated circuit,
   determining if the measured temperature is within a predetermined temperature range including the step of eliminating a temperature measurement from an average measured temperature computation when the temperature measurement is below a predetermined threshold,
   controlling the fan speed based on the average temperatures of at least a portion of said thermal diodes, and
   if the temperature is not within the predetermined range, controlling the fan speed based on the temperature of a single thermal diode.

2. A method according to claim 1 further comprising turning off the fan when the measured temperature is below the predetermined range.

3. A computer program product for controlling fan speed, the computer program product comprising:
   a non-transitory computer readable storage medium having computer readable program code embodied therewith, the computer readable program code comprising:
   computer readable program code configured to measure temperature using a plurality of thermal diodes located on a surface of a single integrated circuit,
   computer readable program code configured to determine if the measured temperature is within a predetermined temperature range including the step of eliminating a temperature measurement from an average measured temperature computation when the temperature measurement is below a predetermined threshold,
   computer readable program code configured to control the fan speed based on the average temperatures of at least a portion of said thermal diodes, and
   if the temperature is not within the predetermined range, computer readable program code configured to control the fan speed based on the temperature of a single thermal diode.

4. The computer program product to claim 3 further comprising computer readable program code configured to turn off the fan when the measured temperature is below the predetermined range.

5. The computer program product to claim 3 further comprising computer readable program code configured to set the fan to a default speed when the measured temperature is below the predetermined range.

* * * * *